United States Patent [19]

Grimm

[11] 4,411,537

[45] Oct. 25, 1983

[54] ELECTRICAL THERMOMETER FOR MEASURING SURFACE TEMPERATURE (I)

[75] Inventor: Dieter Grimm, Schoneck, Fed. Rep. of Germany

[73] Assignee: Degussa Aktiengesellschaft, Frankfurt am Main, Fed. Rep. of Germany

[21] Appl. No.: 354,527

[22] Filed: Mar. 3, 1982

[30] Foreign Application Priority Data

Mar. 25, 1981 [DE] Fed. Rep. of Germany ... 8108694[U]

[51] Int. Cl.³ ............................ G01K 7/04; G01K 7/16
[52] U.S. Cl. ........................................ 374/185; 338/28
[58] Field of Search ....................... 374/185, 183, 163; 338/28, 25

[56] References Cited

U.S. PATENT DOCUMENTS 4,265,117 5/1981 Thoma ................................. 374/185

Primary Examiner—Donald O. Woodiel
Attorney, Agent, or Firm—Cushman, Darby & Cushman

[57] ABSTRACT

There is described an electrical thermometer for measuring surface temperature consisting of a flat temperature probe having lead wires and a metal housing which only exhibits a very slight difference in temperature between the actual surface temperature and the measured value. The housing has a housing bottom, a recess or opening in the bottom, which is so dimensioned that the temperature probe and housing are not in contact. The temperature probe is positioned in this recess by means of a leaf spring secured to the housing.

8 Claims, 2 Drawing Figures

ELECTRICAL THERMOMETER FOR MEASURING SURFACE TEMPERATURE (I)

BACKGROUND OF THE INVENTION

The invention is directed to an electrical thermometer for measuring surface temperatures and consists essentially of a flat temperature probe having lead wires and a metal housing.

In the measurement of temperatures on surfaces there frequently result more or less, large differences between the actual surface temperature and the value measured by a thermometer. As a rule the cause of this is a non-optimal construction of the thermometer and the insufficient attachment to the surface to be measured. The defect caused by the construction chiefly is in the too strong dissipation of heat via the protective housing of the thermometer in a holder of the temperature probe with heating of material surrounding it and in the tolerances based on the manufacture in the distance between temperature probe and the surface to be measured. Besides a variably strong contacting of the thermometer and the surface to be measured causes an additional deviation between actual temperature and measured value.

There are known electrical thermometers for measuring surface temperatures having round and flat temperature probes which either are attached directly or by way of an intermediate carrier to the object to be measured.

Therefore it was the problem of the present invention to provide an electrical thermometer for measuring surface temperatures consisting essentially of a flat temperature probe having lead wires and a metal housing which should only exhibit the least possible temperature difference between the actual surface temperature and the measured value. Particularly with thermometers that are employed in pairs or in larger number for comparative temperature measurements of small temperature difference, e.g. in measuring amounts of heat, the disturbing factors must be reduced to an insignificant degree for the temperature measurement.

SUMMARY OF THE INVENTION

This problem is solved according to the invention by providing that the housing has in the housing bottom a recess or opening of a size accommodating the temperature probe which avoids contact between the temperature probe and the housing and the temperature probe is positioned resiliently in the opening by means of a leaf spring secured to the housing, whereby the surface of the temperature probe projects beyond the surface of the housing. Preferably it projects beyond the housing around 0.1 to 0.5 mm.

Advantageously the leaf spring is secured on the housing by bending over the corners of the housing and is so constructed that a specific bearing load is attained on the temperature probe and therewith on the surface to be measured.

DETAILED DESCRIPTION

Figure 1:
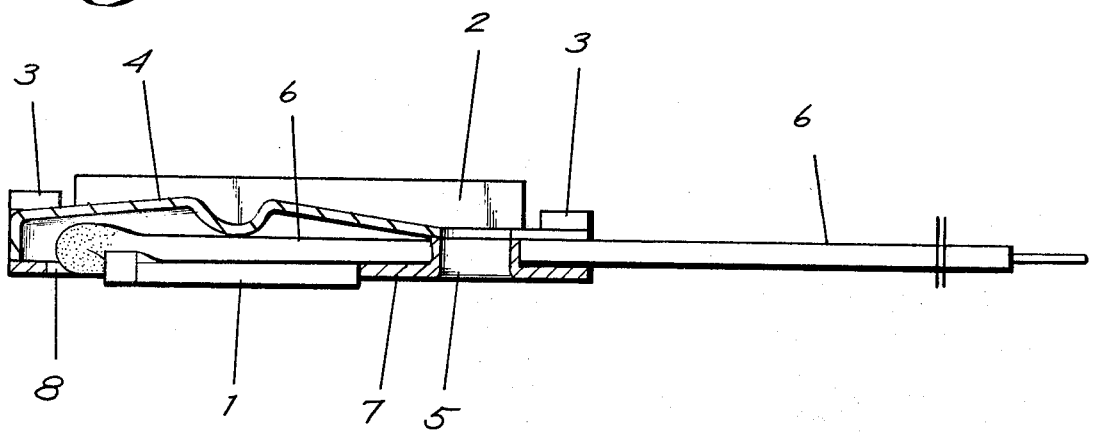
FIG. 1 schematically illustrates one form of the electrical probe of the invention in longitudinal section.
Figure 2:
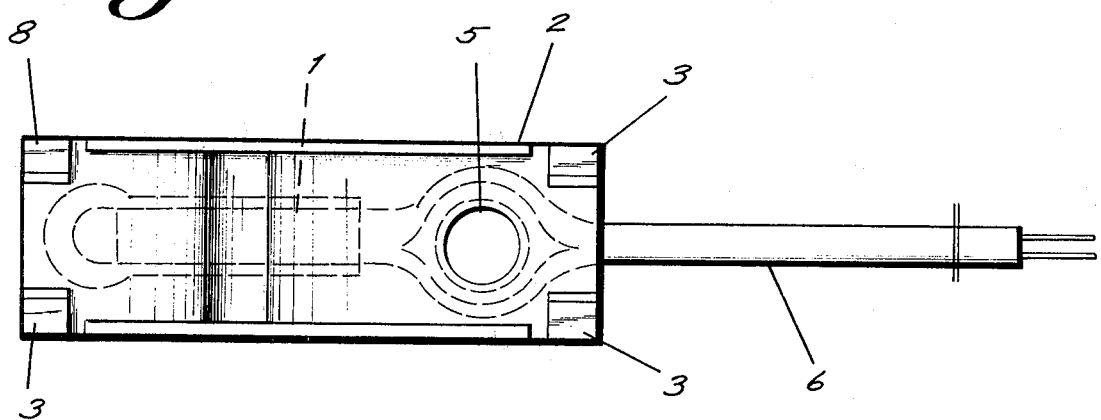
FIG. 2 schematically illustrates the electrical probe in top place view.

The electrical thermometer consists of a temperature probe 1, preferably a measuring resistance having a conductor track applied to a ceramic carrier which combined with lead wires 6 is fitted into a metal housing 2. The housing bottom 7 contains an opening 8 which is so dimensioned in length and width that the temperature probe 1 arranged therein is not in direct contact with the housing 2. A plate or leaf spring 4 is secured on the housing 2 via the four bent over housing corners 3, which spring so positions the temperature probe 1 in the opening 8 that the surface of the temperature probe 1 projects beyond the surface of the housing 2 and does not touch the interior of the housing so that in pressing the thermometer on the surface to be measured, the temperature probe 1 joins this surface with a specific pressure.

Advantageously a portion of the lead wires 6 is located between the temperature probe 1 and the spring 4. Through this arrangement which makes difficult a heat flow between temperature probe 1 and leaf spring 4 on account of the heating insulating effect of the lead wires 6 and the contact free positioning of the temperatures probe 1 in the recess 8 in the relation to the housing 2 there is substantially presented a falsification of the temperature measurement.

Preferably the lead wires 6 are inserted between housing 2 and leaf spring 4 through which there results a good release of tension of the wires 6. An additional release of tension is reached if the housing 2 is provided with a passage 5 where the individual wires of the lead wires 6 are separately lead around to separate the lead wires.

The temperature probe 1 can be constructed both as a measuring resistance as well as a thermoelement.

The electrical thermometer of the invention makes possible more exact temperature measurements than previously, whereby the difference between the actual surface temperature and the measured value is very small. This also makes possible the employment of this thermometer for comparative measurement at slight differences in surface temperature, as e.g., the measurements of amounts of heat.

The entire disclosure of German priority application No. G 8108694.6 is hereby incorporated by reference.

What is claimed is:

1. An electrical thermometer suitable for the measurement of surface temperatures comprising in combination, a flat temperature probe having lead wires and a metal housing, said housing having a housing bottom, a recess in said housing bottom, said recess being larger in width and length than said probe, that depending on the size of the temperature probe there is avoided contact between the temperature probe and the housing, said temperature probe being positioned in the recess by means of spring means secured to the housing, whereby the surface of the temperature probe extends beyond the surface of the housing, said spring means being a leaf spring which is secured to the housing by bent over housing corners.

2. An electrical thermometer according to claim 1 having lead wires to the temperature probe, said lead wires being positioned between the housing and the leaf spring means.

3. An electrical thermometer according to claim 1 having lead wires to the temperature probe, said lead wires being positioned between the housing and the spring means.

4. An electrical thermometer according to claims 2 or 3 wherein there is provided a passage in the housing which separates the lead wires for additional relief of tension of the lead wires.

5. An electrical thermometer according to claim 4 wherein a portion of the lead wires is arranged between the temperature probe and said spring means.

6. An electrical thermometer according to claim 1 wherein a portion of the lead wires is arranged between the temperature probe and said spring means.

7. An electrical thermometer according to claim 1 wherein the temperature probe is constructed as a measuring resistance.

8. An electrical thermometer according to claim 1 wherein the surface of the temperature probe extends beyond the surface of the housing 0.1 to 0.5 mm.

* * * * *